United States Patent [19]
Riedlinger

[11] Patent Number: 5,690,017
[45] Date of Patent: Nov. 25, 1997

[54] DIAPHRAGM PUMP WITH AT LEAST ONE RECIPROCATING PISTON AND BALANCING DEVICE THEREFOR

[75] Inventor: Heinz Riedlinger, Bremen, Germany

[73] Assignee: KNF Neuberger GmbH, Freiburg, Germany

[21] Appl. No.: 785,736

[22] Filed: Jan. 17, 1997

[30] Foreign Application Priority Data

Jan. 19, 1996 [DE] Germany ................. 196 01 839.0

[51] Int. Cl.$^6$ ................................................ F01B 19/00
[52] U.S. Cl. ...................... 92/100; 74/573 R; 417/413.1; 92/96
[58] Field of Search ........................ 74/573 R, 574; 301/5.22; 417/413.1; 92/100, 96, 99

[56] References Cited

U.S. PATENT DOCUMENTS

| | | |
|---|---|---|
| 2,331,756 | 10/1943 | Zobel . |
| 3,109,321 | 11/1963 | Rogers . |
| 3,166,356 | 1/1965 | Sutherland et al. . |
| 3,410,154 | 11/1968 | Deakin . |
| 3,799,619 | 3/1974 | LaBarber . |
| 3,913,980 | 10/1975 | Cobb, Jr. . |
| 4,117,742 | 10/1978 | Stein .................... 74/573 R |
| 5,592,858 | 1/1997 | Taylor .................... 74/573 R |

FOREIGN PATENT DOCUMENTS

| | | |
|---|---|---|
| 692177 | 8/1964 | Canada .................... 74/573 R |
| 1202949 | 1/1960 | France . |
| 25 28 539 A1 | 1/1976 | Germany . |
| 2823553 C2 | 11/1987 | Germany . |
| 1195203 | 11/1985 | U.S.S.R. .................... 74/573 R |
| WO 93/15335 | 8/1993 | WIPO . |
| WO 93/23687 | 11/1993 | WIPO . |

*Primary Examiner*—Thomas E. Denion
*Attorney, Agent, or Firm*—Panitch Schwarze Jacobs & Nadel, P.C.

[57] ABSTRACT

A diaphragm pump 1 has a reciprocating piston 2 operated with the aid of a connecting rod 5 and by this means moves an attached diaphragm 4 fixed in the pump housing 3. The connecting rod 5, in turn, is acted upon and driven at the end facing away from the reciprocating piston 2 by an eccentric 6 or a cranked portion of the drive shaft 11. The rotating masses and at least part of the oscillating masses of the pump are balanced by at least one fixedly mounted counterweight 7 moving in synchronism therewith. For the automatic correction of varying out-of-balance conditions due to variable gas forces or medium forces, a self-regulating system of rolling elements 12 is provided in an annular, empty cavity 9 that is arranged concentrically to the axis of shaft rotation and is situated within a co-rotating housing 10. Arranged in this cavity 9 are rolling elements 12, preferably balls, which are capable of rolling freely on the interior surface 13 of the outer periphery, thus on the radially outermost wall of the cavity 9, and even in case of slight imbalances begin to move until they have reached the position of optimal mass balance.

18 Claims, 4 Drawing Sheets

DIAPHRAGM PUMP WITH AT LEAST ONE RECIPROCATING PISTON AND BALANCING DEVICE THEREFOR

BACKGROUND OF THE INVENTION

The invention relates to a diaphragm pump having at least one diaphragm and, fastened to the diaphragm, a reciprocating piston acted upon by a connecting rod which, in turn, is acted upon and driven at the end facing away from the reciprocating piston by an eccentric or a cranked portion of the drive shaft, in which diaphragm pump the rotating masses and at least part of the oscillating masses are balanced by at least one counterweight or mass fixedly mounted thereon and moving in synchronism therewith.

Diaphragm pumps are known in diverse forms and sizes. The masses movable by the cranked portion of the drive shaft or by the eccentric, and the other masses movable eccentrically and transversely of the rotation, hence both the rotating and the oscillating masses, are balanced by fixedly mounted counterweights moving in synchronism.

Although such a balancing of masses is carried out with great care, vibrations cannot always be eliminated. Above all, varying forces may arise in diaphragm pumps as a result of the respective pumped medium, namely, according to occurring counterpressure or also according to volumetric delivery and/or speed of the diaphragm pump. Due to the variation in such counterforces, these vibrations are tolerated and, at most, are moderated by damping elements.

As compared with other piston machines, special conditions are caused by the diaphragm in diaphragm pumps, because the piston stroke is to some extent impeded and is in any case affected by the diaphragm. At the same time, the diaphragm movements are affected not only by the connecting rod, but also by possibly fluctuating or varying pressures on the one hand and by fluctuating or varying underpressures on the other, this again leading by way of the connecting rod to reaction forces and thereby to additional, unpredictable "imbalances." In diaphragm pumps of normal speeds and particularly in the pumping or suction of a gaseous medium, the conditions are liable to change very rapidly, so that in addition these unpredictable imbalances are also liable to change very rapidly in their magnitude.

BRIEF SUMMARY OF THE INVENTION

The object underlying the invention is therefore to provide a diaphragm pump of the kind set forth at the outset, in which varying forces, particularly reaction forces occurring at the diaphragm as a result of a pumped medium can be balanced very largely automatically. This balance of such forces is to be achievable with speed and sensitivity and also as, or shortly after, the diaphragm pump starts up.

To accomplish this object, the diaphragm pump set forth at the outset is characterized in that arranged concentrically to the axis of rotation about which the eccentric or the cranked portion of the drive shaft revolve during the operation of the diaphragm pump is an annular cavity within a co-rotating housing or housing portion, that arranged in this cavity there are at least two rolling elements which are capable of rolling freely on the interior surface of the outer periphery of the cavity, that except for the rolling elements, the interior of the annular cavity is empty and devoid of liquid, and that the radial width of the annular cavity slightly exceeds the diameter oriented in that direction of the rolling elements in such a way that, as a result of the unbalance present during start-up, the rolling elements are movable to and fro between the outer and inner surfaces or walls of the annular cavity, so that during start-up the rolling elements are initially entrainable in a circumferential direction due to a sliding friction between them and the radial limits of the annular cavity.

In a surprising fashion, the conventional balancing of masses of such a diaphragm pump is thus combined with an automatic balancing unit which has to be compatible only with varying forces of gas or another medium.

To be sure, this principle for balancing or for correcting an out-of-balance condition has been known for decades, but each time was employed for correcting an imbalanced condition in rotating parts only. For a combination of a rotational movement with an oscillating movement, however, it is surprising to provide this principle in addition to the fixedly mounted, co-rotating balancing masses. Hence, the invention proposes that the principle of correcting an out of-balance condition with the aid of rolling elements circulating in an annular cavity be used for diaphragm pumps, in order that in so doing the usually variable forces arising through the delivery of a medium or possibly also through the opposite effect of a medium be automatically balanced, at least largely so. As the requisite masses for mass balance for the eccentric or the cranked portion of the shaft and the connecting rod or the like are fixedly installed, only relatively small masses need be used for the self-regulating balance of the variable forces or counterforces. The rolling elements can be correspondingly small and light, with the result that even in case of slight imbalances or counterforces to be balanced, they start to move inside the annular cavity until they have reached the place of optimal mass balance. Thus, a particularly accurate and sensitive balancing of masses ensues, because by way of this principle the rolling elements do not have to balance all the dynamic forces, but only the forces deriving from the pumped medium and resultant imbalances and vibrations.

Since, except for the rolling elements, the interior of the annular cavity is empty and devoid of liquid, correspondingly low resistance is encountered in the rolling of the rolling elements, leading to a correspondingly sensitive and rapid reaction in case of changing forces. To be sure, automatic balancing devices are already known in which the rolling elements are arranged together with an oil in a cavity. However, this leads to a correspondingly inert system because the resistance of the liquid has to be overcome, so that this would not be suited for rapid balancing of varying gas forces.

Selecting the radial width of the annular cavity to be only slightly larger than that of the rolling elements is of great importance and effectiveness particularly during start-up of the diaphragm pump. For, during start-up, at first no rolling takes place, but sliding friction develops so that the rolling elements also exert pressure forces on one another. Due to this friction and the mass inertia, a rolling element situated in the lower area of the cavity can somewhat displace and, in so doing, also radially lift the neighbouring rolling element, so that it contacts the inner wall of the cavity. Since the radial dimension of the cavity only slightly exceeds that of the rolling elements, even a very slight, radially inward reaction movement of a rolling element suffices. Yet through such a reaction movement, the rolling elements as a whole are then entrained in the direction of rotation due to the friction, so as then to be able to distribute themselves freely over the circumference of the cavity, depending on the imbalance occurring.

When the machine is running at its operating speed, the imbalance is so slight owing to the fixedly mounted counterbalance that, as a result of the centrifugal force, the rolling elements are kept at and move on the outer raceway, hence the radially outer surface of the cavity. As a consequence, they can now roll according to the changes in imbalance, because they are slightly spaced from the inner surface of the cavity. The resistance opposing this rolling motion is correspondingly slight, because there is also no liquid filling present in the cavity. Therefore, in case of changes and vibrations arising as a result of varying counterforces, such out-of-balance conditions are automatically corrected with great accuracy, high sensitivity and rapid adaptation. Tests have shown that this combination of features and measures permits a responsive, accurate and sensitive balance of vibrations occurring as a result of varying gas forces.

In practice it can be achieved that the rolling elements are entrained already when the diaphragm pump starts up, even without liquid filling of the cavity, although on the basis of the low friction with respect to the raceway and on the basis of their weight, they would actually remain at the lowest point of the raceway. This applies particularly if and when the axis of rotation for the housing exhibiting the annular cavity is arranged horizontally in the position of use. The above-described "jostle" of the rolling elements within the cavity only slightly exceeding their dimension leads to a certain "jamming together," through which they are nevertheless entrained during start-up.

It is suitable if the annular cavity takes the form of a circular groove whose open side is closed by a detachable cover. The assembly and particularly also introducing the rolling elements into this groove is correspondingly simple. Furthermore, in this way the annular cavity can be manufactured on the one hand very simply and on the other hand also very accurately. For it is important that as little resistance as possible opposes the movement of the rolling elements, so that a raceway of suitable precision is advantageous. In addition, the raceway and the rolling elements may be hardened for the minimum resistance.

The radial width of the annular cavity can exceed the maximum diameter of the rolling elements by about one half percent to two percent, preferably by about one percent to one and a half percent, in particular by less than one tenth of a millimeter to about a quarter of a millimeter. This represents particularly advantageous dimensional relationships with respect to the solution according to the invention, according to which namely the radial width of the annular cavity slightly exceeds the diameter of the rolling elements oriented in that direction.

The cross section of the outer-lying cavity wall serving as raceway can be arranged so as to be parallel to the axis and rectilinear at right angles to the diameter, hence at least that surface of the annular cavity which is situated on the larger diameter can form a hollow cylinder. This is particularly simple to produce because, as compared to, for instance, a somewhat convex configuration of this cavity wall or raceway, no undercut has to be formed. Moreover this makes it easier to fill in the rolling elements.

It is particularly advantageous if that wall of the cavity which is arranged on a smaller diameter is formed, in the same way as the outer wall, so as to be rectilinear and hence parallel to the outer wall. The rolling elements can be adapted with corresponding accuracy to the radial clearance of these limits of the cavity, such clearance being constant throughout the circumference and also in the axial direction. In addition, filling or replacing or adding rolling elements is correspondingly simple. As compared with an annular cavity whose two radial limits are configured so as to be convex away from each other, a special filler hole can be avoided.

A preferred embodiment may comprise that the rolling elements are balls, i.e., spheres. Balls lend themselves to highly accurate and precise manufacture and can circulate particularly well in an annular cavity during operation, without there being any danger of canting. During initial start-up, however, such canting can be utilized to distribute the balls within the cavity, due to the selected dimensional relationships.

It is advantageous, both for the mass balance and for initial start-up and the "canting" initially desired for a short time, if at least three or four, particularly five rolling elements or balls, preferably of the same size and particularly the same mass, are arranged in the annular cavity. Tests have shown that by this means, particularly in diaphragm pumps in which the connecting rod performs a movement directed upward and downward, a sensitive balance of varying gas forces is possible. It is further advantageous that there is no liquid in the annular cavity, which would increase the resistance because it would also have to be displaced.

BRIEF DESCRIPTION OF THE SEVERAL VIEWS OF THE DRAWING

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

A diaphragm pump, generally designated 1, has in a known way a reciprocating piston 2 to which a diaphragm 4 fixed in the housing 3 is attached in a known fashion.

Figure 3:
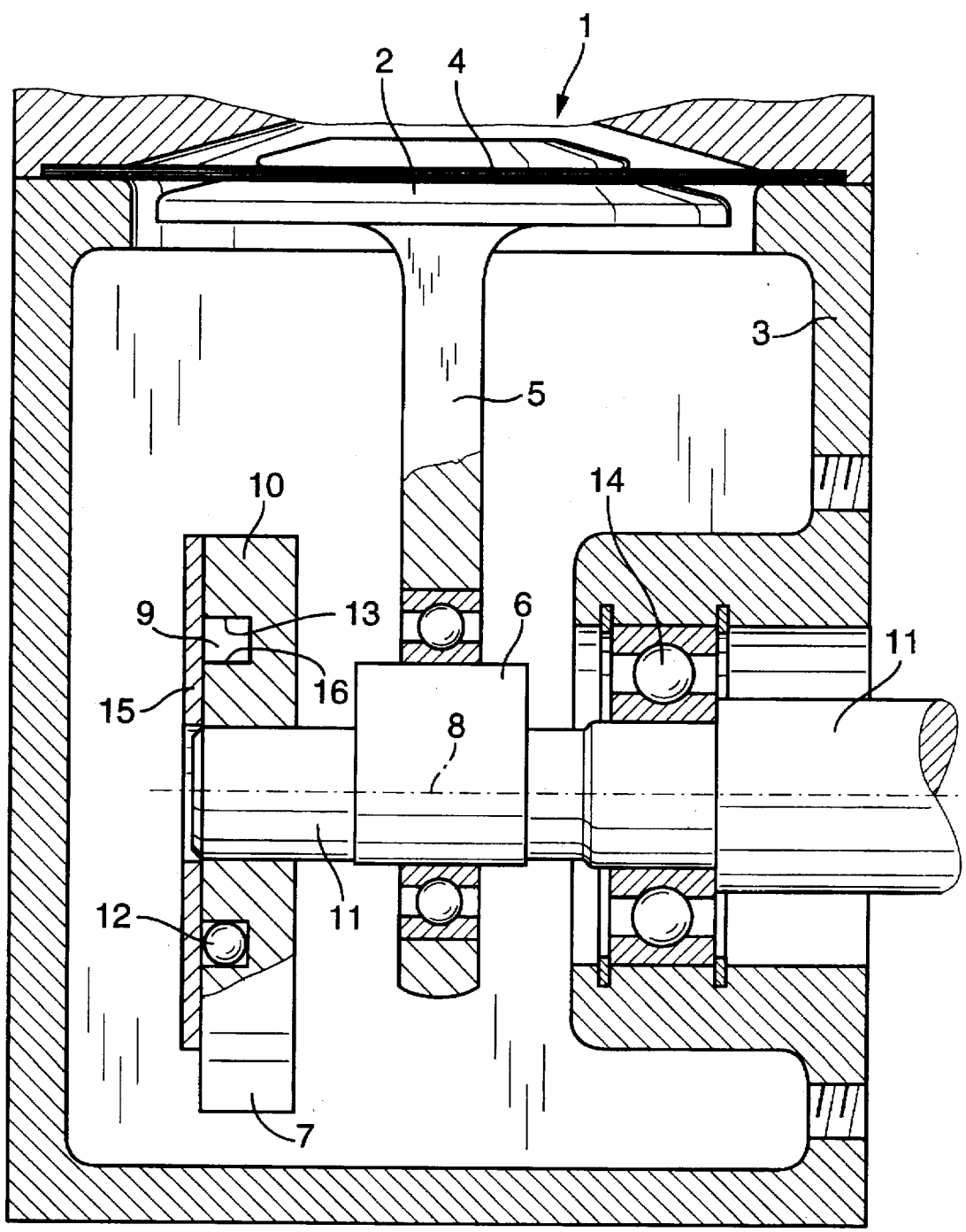
FIG. 3 is a vertical section turned 90° as compared to the views in FIGS. 1 and 2, showing the bearing of the connecting rod and the axis of the eccentric as well as a housing with the annular cavity for the balls capable of rolling freely therein.

The reciprocating piston 2 is acted upon by a connecting rod 5 which, in turn, is acted upon and driven at the end facing away from the reciprocating piston 2 by an eccentric 6 (cf. FIG. 3). Instead of the eccentric 6, a cranked portion of the shaft could also be provided. The given rotating masses and at least part of the given oscillating masses are balanced by a fixedly mounted counterweight 7 moving in synchronism.

Figure 1:
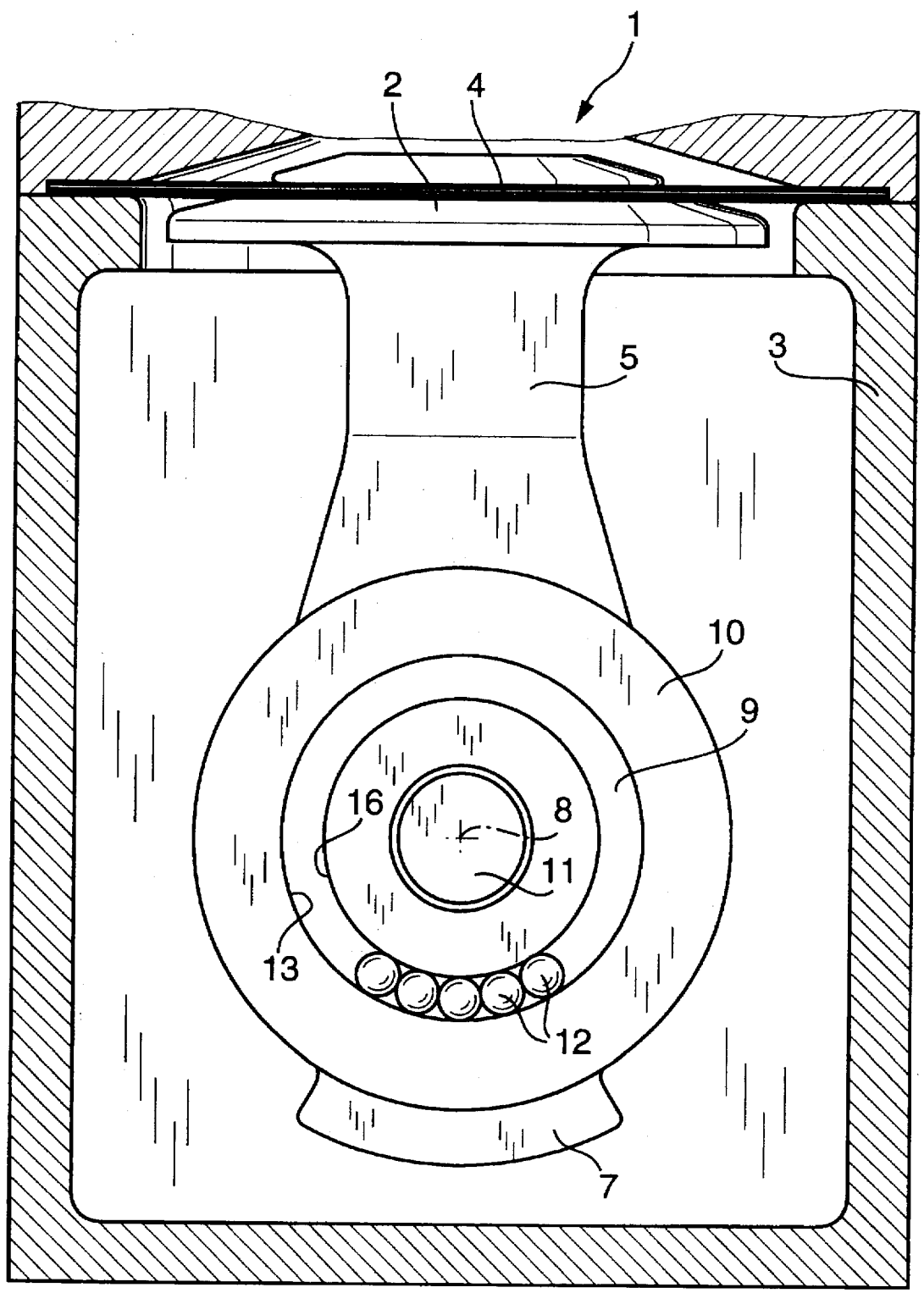
FIG. 1 is a vertical section through the housing of a diaphragm pump with a view of a concentrically arranged housing having an annular groove arranged in which are five rolling elements in the form of balls for automatically balancing varying gas forces, wherein this diaphragm pump is at rest.

Particularly in looking at FIGS. 1 and 3 together, one can see that arranged concentrically to the axis of rotation 8 about which the eccentric 6—or optionally a cranked portion of the shaft—revolves during the operation of the diaphragm pump 1 is an annular cavity 9 within a co-rotating housing 10, which housing 10 is over-mounted on the shaft 11 presenting the eccentric 6. Arranged in this annular cavity 9 are a plurality of rolling elements 12 capable of rolling freely on the interior surface 13 of the outer periphery of the cavity 9, hereinafter also referred to as the outer surface 13.

FIG. 3 shows that the co-rotating housing 10 is arranged at a free end of the shaft 11 so as to be adjacent to the eccentric 6, and the bearing of the connecting rod 5 is arranged on this eccentric. The bearing, in the exemplary embodiment a roller bearing 14, for this shaft 11 is provided on the side facing away from this housing 10.

In looking at the figures together it becomes clear that the annular cavity 9 takes the form of a circular groove whose open side is closed by a detachable cover 15. The radial width of the annular cavity 9 corresponds approximately to the maximum diameter of the rolling elements 12, but exceeds such so slightly as not to be visible in the drawing. By way of example, the radial width of the annular cavity 9 exceeds the maximum diameter of the rolling elements 12 by about one half percent to two percent, preferably by about one percent to about one and a half percent of this diameter. In practice, this can signify less than one tenth of a millimeter to about a quarter of a millimeter by which the width of the groove forming the annular cavity 9 exceeds the diameter of the rolling elements.

By this means it is achieved that when the diaphragm pump 1 starts up, the rolling elements 12 initially all disposed according to FIG. 1 at a lowest point of the annular cavity 9 are flung and moved to and fro within the relatively narrow groove through the resultant unbalance. Hence the rolling elements cannot be set into a rotary movement corresponding to a rolling motion, because they alternately contact the inner surface 16 and the outer surface 13 of the annular cavity 9. Thus, during the start-up phase, a sliding friction develops, so that the rolling elements 12 are distributed more or less evenly over the circumference of the cavity 9.

Figure 2:
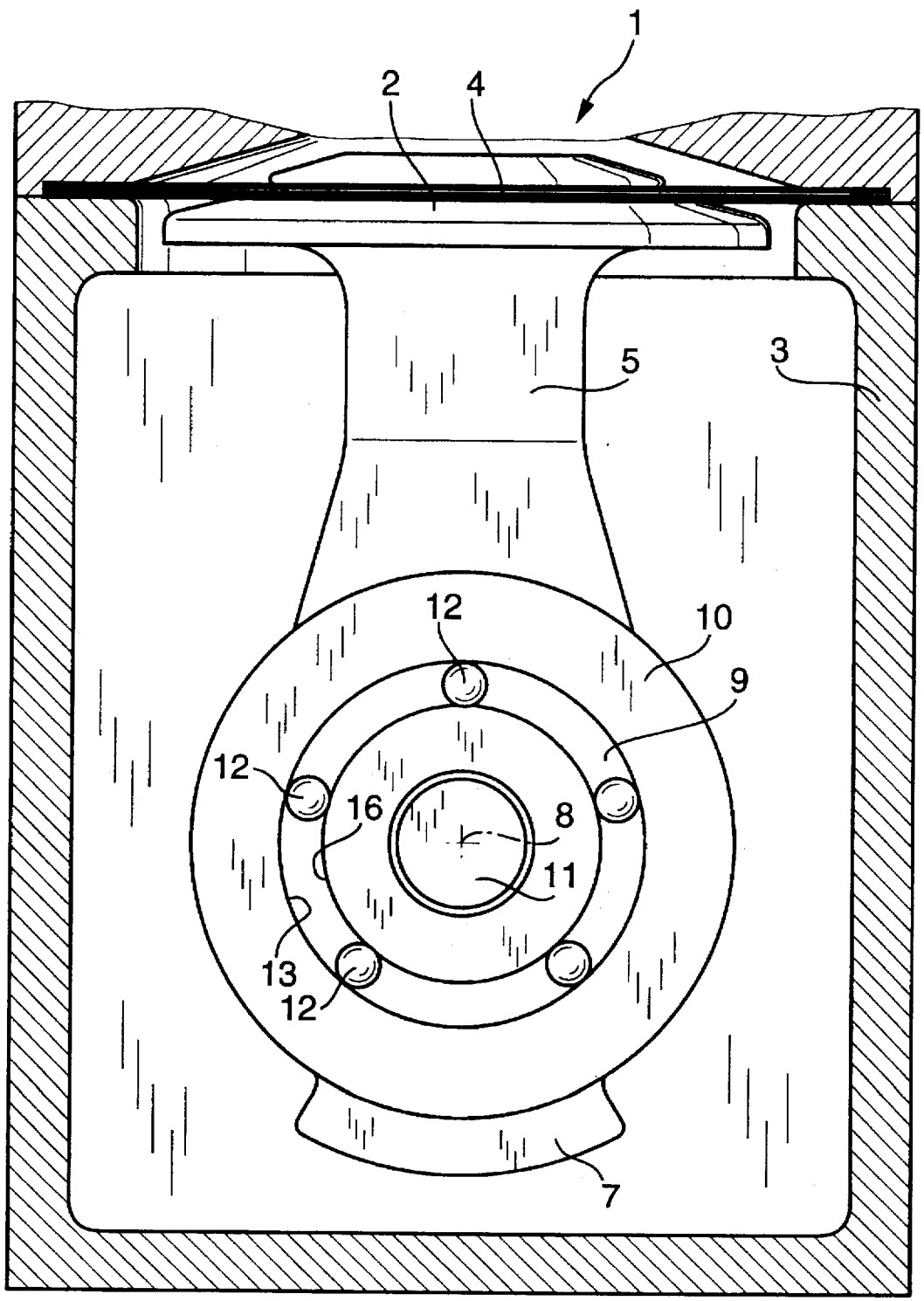
FIG. 2 is a view corresponding to that of FIG. 1 during operation, in which, for balancing a certain gas force, the five balls serving as rolling elements have distributed themselves within their annular cavity and automatically correct the out-of-balance condition arising from this gas force.
Figure 4:
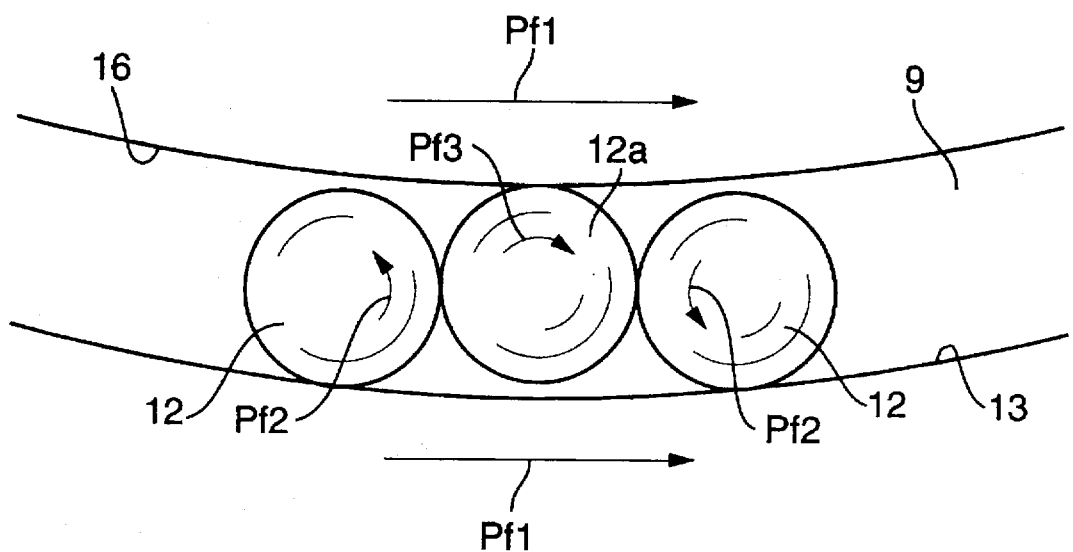
FIG. 4 is an enlarged schematic view of three rolling elements or balls in contiguity as the diaphragm pump starts up, with their cavity in the form of an annular groove.
Figure 5:
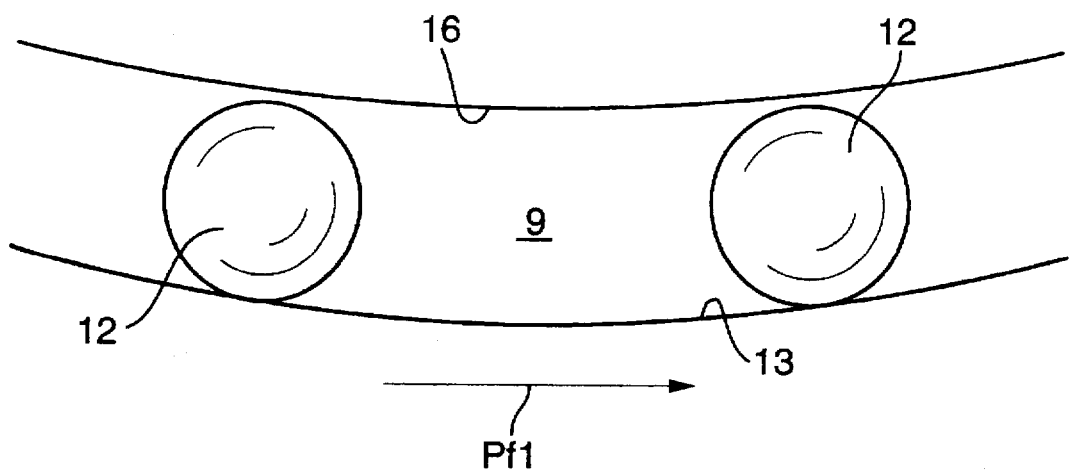
FIG. 5 is a view corresponding to that of FIG. 4 during the normal operation of the pump, that is, after the initial start-up phase and after the balls or rolling elements have thereby been distributed within the cavity.

FIG. 4 illustrates the starting process in schematic form. When the diaphragm pump 1 and therewith its housing 10 starts up in the direction of arrow Pf1, the rolling elements 12 or balls bearing against the outer surface 13 of the annular cavity 9 at its lowest point are set into counterrotation according to arrows Pf2 due to their friction in response to the reaction forces. This applies, however, only for the two outer rolling elements 12, while an intermediate rolling element 12a, due to its friction relative to the rolling bodies 12 contacting it on either side, is set into rotation in an opposite direction, as indicated by the arrow Pf3. This simultaneously has the result that the two rolling elements 12 contacting the intermediate rolling element 12a lift it in a radial direction, and it thereby establishes contact with the inner surface 16 of the groove-like cavity 9, so that the rolling elements 12 and 12a become wedged in the cavity 9. By this means, the whole group of rolling elements 12 is entrained in the direction of rotation to an extent such that, also by the gravitational force and by the dynamics of the starting process, the rolling elements separate from one another as operation progresses and, according to the imbalance, assume their position within the groove-like cavity 9, as is indicated in FIGS. 2 and 5. In FIG. 5, only two of the three rolling elements 12 depicted in FIG. 4 are to be seen, because the third rolling element, in turn, assumes a position at a correspondingly great distance from the rolling elements 12 to be seen. The rolling elements 12 can now be held by the centrifugal force, so that they assume their necessary position according to the imbalance.

Once the operating speed is reached, the rolling elements 12 are distributed somewhat as in FIGS. 2 and 5. In case of slight fluctuations of the gas forces arising and the resultant out-of-balance conditions, they can now roll with high sensitivity into the respective position in which they automatically correct this imbalance. This is so because, due to the centrifugal force, they now bear only against the outer surface 13 of the cavity 9 and, due to their somewhat smaller diameter as compared with the width of the cavity 9, they no longer come into contact with the inner surface 16 of this cavity 9 and are hence no longer braked in their rolling motion.

It is helpful in this context that, except for the rolling elements 12, the interior of the annular cavity 9 is empty and devoid of liquid - apart from the usual atmospheric air of course. Hence when the position of the rolling elements 12 changes due to changing forces and resultant imbalances, it is not necessary that a relatively inert portion of liquid also be moved. It is with corresponding exactitude and speed that the system as a whole can react to varying, forces, especially since the constant inertial forces are to a very large degree balanced by the counterweight 7 from the outset, hence only small additional, but varying, forces have to be considered. In addition, however, inaccuracies of the counterweight 7 can also be balanced.

FIG. 3 shows that the cross section of the outer surface 13 serving as raceway, hence the external wall of the cavity 9, is configured and arranged so as to be parallel to the axis and rectilinear at right angles to the diameter. Thus that outer surface 13 of the annular cavity 9 which is situated on the larger diameter forms a hollow cylinder. That inner surface 16 of the cavity 9 which is arranged on a smaller diameter is also formed, in the same way as the outer surface 13, so as to be rectilinear and hence parallel to the outer surface 13, so that the radial width of the annular cavity 9 remains uniform in the axial direction. When the cover 15 is open, the rolling elements 12 can thus be placed in the cavity 9 without any difficulty and without a special filling hole.

As the rolling elements 12 are preferably balls, as follows from looking at FIGS. 1 and 3 or 2 and 3 together, there is no danger during operation of any canting, as there might be with cylindrical rolling elements. Arranged in the annular cavity 9 of the exemplary embodiment are five rolling elements 12 in the form of balls, all of the same size and mass. However, it would also be possible to provide a smaller or greater number of balls.

According to FIG. 3, the axis 8 of rotation for the housing 10 exhibiting the annular cavity 9 is arranged horizontally, whereby according to FIG. 1 the connecting rod 5 has a largely vertical orientation. However, it would also be possible that FIG. 3 represents a plan view, hence in the case of a horizontal axis of rotation 8, the connecting rod in turn is arranged horizontally or prone in the position of use. The axis 8 of rotation might also extend vertically in the position of use.

In a suitable manner, the fixedly mounted counterweight 7 is arranged on the housing 10 containing the annular cavity 9, so that an additional function is assigned to this housing 10 by it also accommodating this counterweight for the large masses and their balancing. This counterweight 7 is of course opposite the eccentricity of the eccentric 6 and the orientation of the connecting rod 5, hence according to FIG. 1 is situated at the lowest point in the initial position.

Preferably, at least the outer surface 13, and more preferably all surfaces of the annular cavity 9 that form the raceway, are smoothed, such as by polishing, precision lathe work and/or coating of the surface(s). The smoothness is preferably such as to yield a surface roughness with a peak-to-valley height of no more than about 1.6 μm. Still further, it is preferred that at least the outer surface 13, and more preferably all of the surfaces of the annular cavity 9 and the rolling elements 12 as well, be made of or coated with a corrosion-resistant material. For example, the housing 10 which contains the annular cavity 9 could be made of stainless steel, or the surface(s) could be coated or plated with stainless steel or a hard chromium layer.

Altogether, a diaphragm pump 1 ensues in which, as a result of the fixed balancing mass with the aid of the counterweight 7, the unbalance at full speed is so slight that the rolling elements 12 or balls can roll freely on the outer surface 13 by the centrifugal force. The resistance is very slight, enabling a rapid and accurate, self-regulating mass balance of variable gas forces occurring during operation, but at the same time the design is relatively uncomplicated. Therefore, unwanted vibrations due to variable forces of the medium or gas can be reduced or largely avoided.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A diaphragm pump (1) comprising at least one diaphragm (4) and, fastened to the diaphragm, a reciprocating piston (2) acted upon by a connecting rod (5) which, in turn, is acted upon and driven at an end facing away from the reciprocating piston (2) by one of an eccentric (6) and a cranked portion of a drive shaft, the diaphragm pump's rotating masses and at least part of its oscillating masses being balanced by at least one counterweight (7) fixedly mounted thereon and moving in synchronism therewith, an annular cavity (9) within a co-rotating housing (10) arranged concentrically to an axis of rotation (8) about which the eccentric (6) or the cranked portion of the drive shaft revolve during operation of the diaphragm pump (1), the annular cavity (9) having a radial width bounded by an outer surface (13) and an inner surface (16), at least two rolling elements (12) arranged in said cavity (9) which are capable of rolling freely on the outer surface (13) serving as a raceway, the annular cavity (9) having an interior which is devoid of liquid and empty except for the rolling elements (12), and the radial width of the annular cavity (9) slightly exceeding a radial diameter of the rolling elements (12), in such a way that, as a result of an unbalance present during start-up of the diaphragm pump, the rolling elements (12) are movable to and fro between the outer and inner surfaces (13, 16), so that during start-up the rolling elements (12) are initially entrainable in a circumferential direction due to a sliding friction between themselves and the outer and inner surfaces (13, 16).

2. The diaphragm pump as claimed in claim 1, wherein the annular cavity (9) comprises of a circular groove whose open side is closed by a detachable cover (15).

3. The diaphragm pump as claimed in claim 1, wherein the radial width of the annular cavity (9) exceeds the radial diameter of the rolling elements (12) by about one half percent to two percent.

4. The diaphragm pump as claimed in claim 1, wherein the radial width oft he annular cavity (9) exceeds the radial diameter of the rolling elements (12) by about one percent to one and a half percent.

5. The diaphragm pump as claimed in claim 1, wherein the radial width of the annular cavity (9) exceeds the radial diameter of the rolling elements (12) by less than one tenth of a millimeter to about a quarter of a millimeter.

6. The diaphragm pump as claimed in claim 1, wherein in a radial cross section of the annular cavity (9) the outer surface is oriented parallel to the rotation axis (8) of the housing (10) and rectilinear at right angles to the radial width of the cavity (9), whereby at least the outer surface (13) which is situated on a larger diameter of the annual cavity (9) forms a hollow cylinder.

7. The diaphragm pump as claimed in claim 6, wherein the inner surface (16) which is situated on a smaller diameter of the annular cavity (9) is formed, in the same way as the outer surface (13), so as to be rectilinear and hence parallel to the outer surface (13).

8. The diaphragm pump as claimed in claim 1, wherein the rolling elements (12) are spherical balls.

9. The diaphragm pump as claimed in claim 1, wherein at least three rolling elements (12) are arranged in the annular cavity (9).

10. The diaphragm pump as claimed in claim 1, wherein five rolling elements (12) are arranged in the annular cavity (9).

11. The diaphragm pump as claimed in claim 1, wherein the rolling elements (12) all have a same size and a same mass.

12. The diaphragm pump as claimed in claim 1, wherein the rotation axis (8) for the housing (10) is arranged horizontally in a position of use.

13. The diaphragm pump as claimed in claim 1, wherein the fixedly mounted counterweight (7) is arranged on the housing (10) on a side facing away from an eccentric portion of the eccentric (6) and from the connecting rod (5).

14. The diaphragm pump as claimed in claim 1, wherein at least the outer surface (13) is smoothed.

15. The diaphragm pump as claimed in claim 14, wherein the outer surface (13) is smoothed by at least one of polishing, precision lathe work and a coating.

16. The diaphragm pump as claimed in claim 14, wherein at least the outer surface (13) is smoothed in such a way that a peak-to-valley height is no more than about 1.6 μm.

17. The diaphragm pump as claimed in claim 1, wherein at least the outer surface (13) is made of corrosion-resistant material.

18. The diaphragm pump as claimed in claim 17, wherein the corrosion-resistant material is one of a stainless steel base, a stainless steel coating and a hard chrome plating layer.

* * * * *